US009058640B2

(12) United States Patent
Manabe

(10) Patent No.: US 9,058,640 B2
(45) Date of Patent: Jun. 16, 2015

(54) IMAGE PROCESSING APPARATUS, IMAGE PROCESSING METHOD AND RECORDING MEDIUM

(71) Applicant: CASIO COMPUTER CO., LTD., Shibuya-ku, Tokyo (JP)

(72) Inventor: Yoshitsugu Manabe, Fussa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 142 days.

(21) Appl. No.: 13/965,153

(22) Filed: Aug. 12, 2013

(65) Prior Publication Data

US 2014/0064632 A1  Mar. 6, 2014

(30) Foreign Application Priority Data

Sep. 5, 2012 (JP) ................................ 2012-194901
Oct. 23, 2012 (JP) ................................ 2012-233429

(51) Int. Cl.
| G06K 9/40 | (2006.01) |
| G06T 5/00 | (2006.01) |
| H04N 5/235 | (2006.01) |
| H04N 5/232 | (2006.01) |

(52) U.S. Cl.
CPC . *G06T 5/00* (2013.01); *G06T 5/009* (2013.01); *H04N 5/2355* (2013.01); *G06T 2207/20016* (2013.01); *H04N 5/23232* (2013.01)

(58) Field of Classification Search
None
See application file for complete search history.

(56) References Cited

U.S. PATENT DOCUMENTS

| 8,472,713 | B2 | 6/2013 | Manabe | |
| 8,483,452 | B2 | 7/2013 | Ueda et al. | |
| 2007/0009176 | A1* | 1/2007 | Lim et al. | 382/275 |
| 2008/0253678 | A1* | 10/2008 | Li et al. | 382/260 |
| 2011/0026792 | A1* | 2/2011 | Bertens et al. | 382/131 |
| 2011/0170780 | A1* | 7/2011 | Vaddadi et al. | 382/190 |
| 2013/0148908 | A1* | 6/2013 | Barkan et al. | 382/239 |

FOREIGN PATENT DOCUMENTS

| JP | 2007018379 A | 1/2007 |
| JP | 2010055604 A | 3/2010 |
| JP | 2010147895 A | 7/2010 |
| JP | 2011188277 A | 9/2011 |
| JP | 2012-044639 A | 3/2012 |

OTHER PUBLICATIONS

Japanese Office Action Dated Jun. 24, 2014 in counterpart Japanese Application No. 2012-233429.

* cited by examiner

*Primary Examiner* — Li Liu
(74) *Attorney, Agent, or Firm* — Holtz, Holtz, Goodman & Chick PC

(57) ABSTRACT

An image processing apparatus, including a first obtaining unit which obtains image data; a first generation unit which generates a plurality of levels of pixel values that are respectively smoothed in a plurality of levels of resolutions; a correction unit which corrects the pixel value of the obtained image data for each of the levels; and a control unit which controls so as to form image data in which the pixel value of the obtained image data is enhanced by utilizing a high frequency component in each of the levels of the image data having the pixel value corrected by the correction unit, the high frequency component corresponding to each of the levels of the resolutions.

13 Claims, 11 Drawing Sheets

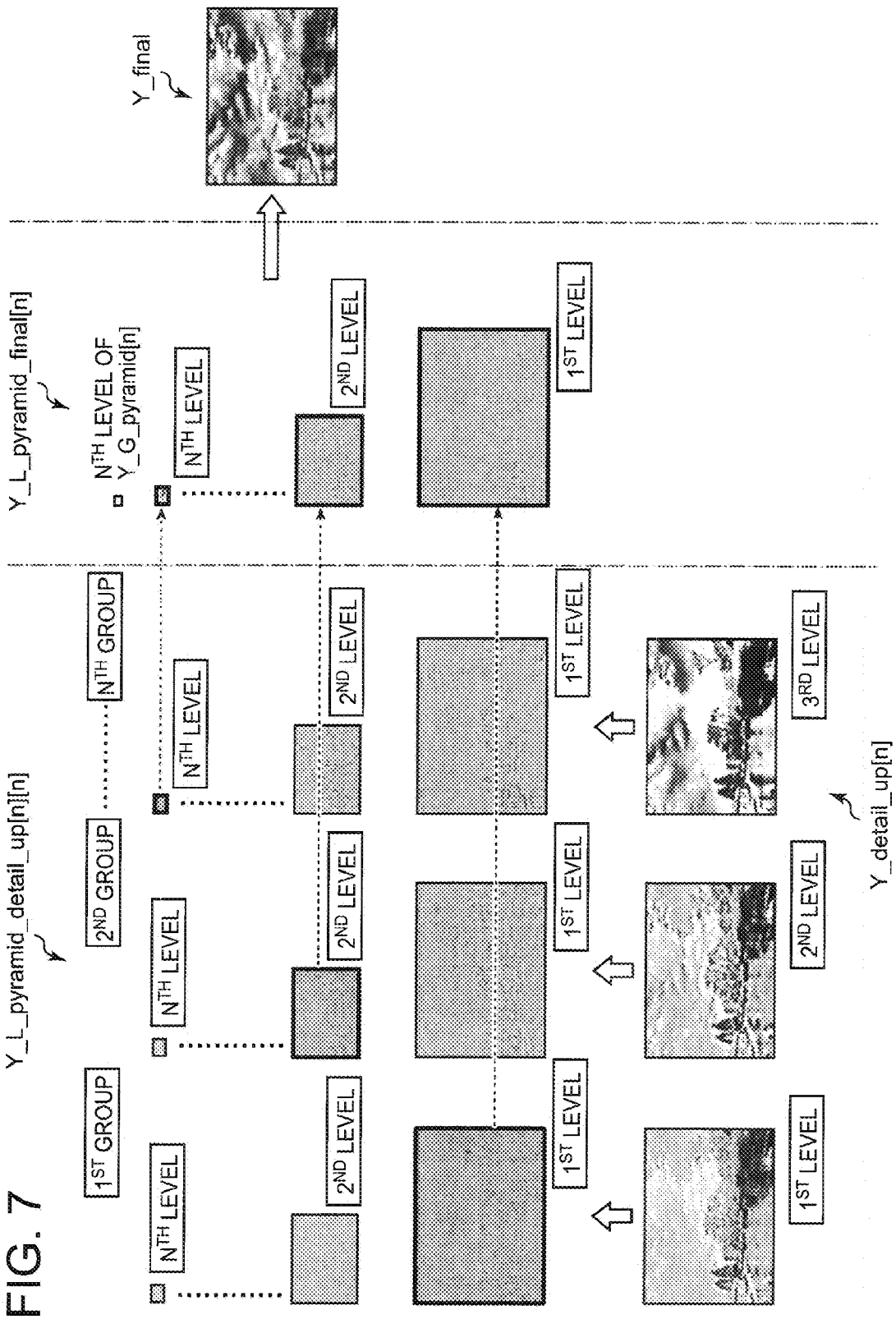

FIG. 8A
FIG. 8B
FIG. 8C  FIG. 8D
 
FIG. 8E  FIG. 8F
 

IMAGE PROCESSING APPARATUS, IMAGE PROCESSING METHOD AND RECORDING MEDIUM

BACKGROUND OF THE INVENTION

1. Field of the Invention

The present invention relates to an image processing apparatus; an image processing method and a recording medium.

2. Description of Related Art

Conventionally, as described in Japanese Patent Application Laid Open Publication No. 2012-044639, there has been suggested a method for generating an image in which a luminance component and a chroma component are extensively enhanced within a level of maintaining a reality as for high dynamic range images.

Such technique locally enhances contrast by performing unsharp mask processing in two different frequency regions (for example, low frequency region and mid frequency region).

SUMMARY OF THE INVENTION

An object of the present invention is to enable appropriate image processing regardless of whether the contrast difference is large or small.

In order to solve the above problem, according to a first aspect of the present invention, there is provided an image processing apparatus, including: a first obtaining unit which obtains image data; a first generation unit which generates a plurality of levels of pixel values that are respectively smoothed in a plurality of levels of resolutions by repeatedly performing smoothing processing and resolution conversion processing on a pixel value of the image data obtained by the first obtaining unit; a correction unit which corrects the pixel value of the obtained image data for each of the levels on the basis of a difference between the pixel value of the image data obtained by the first obtaining unit and the pixel value in each of the levels generated by the first generation unit; and a control unit which controls so as to form image data in which the pixel value of the obtained image data is enhanced by utilizing a high frequency component in each of the levels of the image data having the pixel value corrected by the correction unit, the high frequency component corresponding to each of the levels of the resolutions.

According to a second aspect of the present invention, there is provided an image processing method which uses an image processing apparatus, the method including: obtaining image data; generating a plurality of levels of pixel values which are respectively smoothed in a plurality of levels of resolutions by repeatedly performing smoothing processing and resolution conversion processing on a pixel value of the obtained image data; correcting the pixel value of the obtained image data for each of the levels on the basis of a difference between the pixel value of the obtained image data and the generated pixel value of each of the levels; and controlling so as to form image data in which the pixel value of the obtained image data is enhanced by utilizing a high frequency component in each of the levels of the image data having the corrected pixel value, the high frequency component corresponding to each of the levels of the resolutions.

According to a third aspect of the present invention, there is provided a recording medium which stores a program for making a computer of an image processing apparatus function as: an obtaining unit which obtains image data; a generation unit which generates a plurality of levels of pixel values that are respectively smoothed in a plurality of levels of resolutions by repeatedly performing smoothing processing and resolution conversion processing on a pixel value of the image data obtained by the obtaining unit; a correction unit which corrects the pixel value of the obtained image data for each of the levels on the basis of a difference between the pixel value of the image data obtained by the obtaining unit and the pixel value of each of the levels generated by the generation unit; and a control unit which performs control so as to form image data in which the pixel value of the obtained image data is enhanced by utilizing a high frequency component in each of the levels of the image data having the pixel value corrected by the correction unit, the high frequency component corresponding to each of the levels of the resolutions.

BRIEF DESCRIPTION OF THE DRAWINGS

The above and other objects, advantages and features of the present invention will become more fully understood from the detailed description given hereinafter and the appended drawings which are given by way of illustration only, and thus are not intended as a definition of the limits of the present invention, and wherein:

FIG. 7 is a diagram which schematically shows an example of an image according to the image capturing processing of FIG. 2;

FIGS. 8A to 8F are diagrams each of which schematically shows an example of an image according to the image capturing processing of FIG. 2;

DETAILED DESCRIPTION OF THE PREFERRED EMBODIMENT

Hereinafter, specific embodiments of the present invention will be described by using the drawings. However, the scope of the present invention is not limited to the illustrated examples.

Embodiment 1

Figure 1:
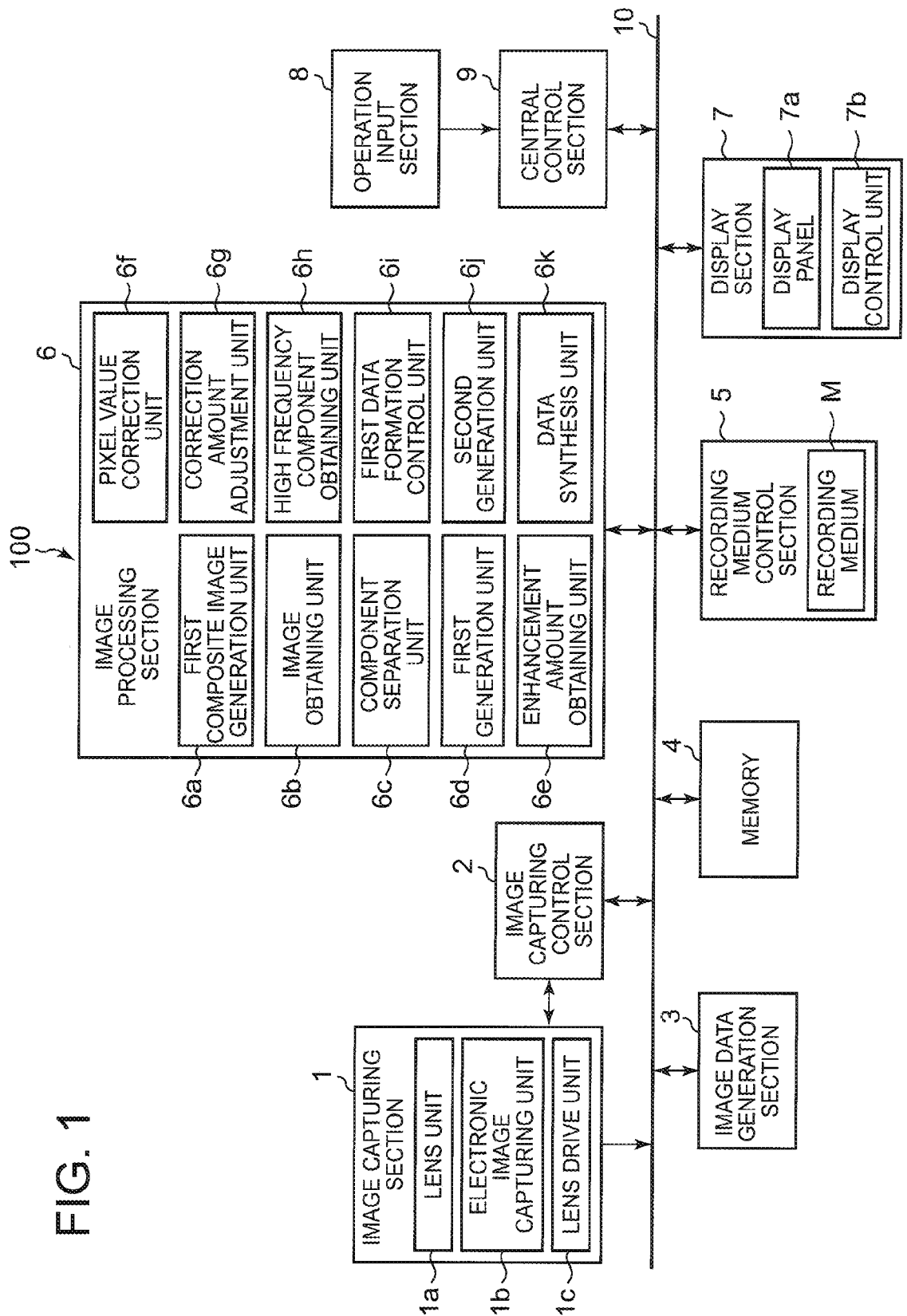
FIG. 1 is a block diagram showing a schematic configuration of an image capturing apparatus of an embodiment 1 to which the present invention is applied.

FIG. 1 is a block diagram showing a schematic configuration of an image capturing apparatus 100 of the embodiment 1 to which the present invention is applied.

As shown in FIG. 1, specifically, the image capturing apparatus 100 of the embodiment 1 includes an image capturing section 1, an image capturing control section 2, an image data generation section 3, a memory 4, a recording medium control section 5, an image processing section 6, a display section 7, an operation input section 8 and a central control section 9.

The image capturing section 1, the image capturing control section 2, the image data generation section 3, the memory 4, the recording medium control section 5, the image processing section 6, the display section 7 and the central control section 9 are connected to each other via a bus line 10.

The image capturing section 1 captures an image of a predetermined subject (a person, for example) to generate a frame image.

Specifically, the image capturing section 1 includes a lens unit 1a, an electronic image capturing unit 1b and a lens drive unit 1c.

The lens unit 1a is configured by including multiple lenses such as a zoom lens and a focus lens, for example.

The electronic image capturing unit 1b is configured by including an image sensor (image capturing element) such as a CCD (Charge Coupled Device) and a CMOS (Complementary Metal-oxide Semiconductor), for example. The electronic image capturing unit 1b converts an optical image transmitted various lenses of the lens unit 1a into a two-dimensional image signal.

The lens drive unit 1c includes, for example, a zoom drive unit which shifts the zoom lens into an optical axial direction, a focusing drive unit which shifts the focus lens into the optical axial direction, and such like, which are not shown in the drawings.

The image capturing section 1 may include a diaphragm (not shown in the drawings) which adjusts the amount of light transmitted the lens unit 1a, in addition to the lens unit 1a, the electronic image capturing unit 1b and the lens drive unit 1c.

The image capturing control section 2 controls the image capturing of the subject by the image capturing section 1. That is, the image capturing control section 2 includes a timing generator, a driver and such like which are not shown in the drawings. The image capturing control section 2 drives, by the timing generator and the driver, the electronic image capturing unit 1b to scan to convert the optical image transmitted through the lens unit 1a into the two-dimensional image signal every predetermined period, and reads out the frame image from the image capturing area of the electronic image capturing unit 1b by an amount of one screen and outputs the frame image to the image data generation section 3.

Furthermore, the image capturing control section (image capturing control unit) 2 controls the image capturing section 1 so as to capture an image multiple times in nearly same compositions altering the exposure condition.

Figure 4A:
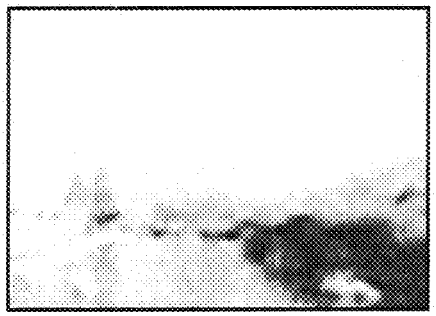
FIGS. 4A to 4D are diagrams each of which schematically shows an example of an image according to the image capturing processing of FIG. 2.

That is, the image capturing control section 2 controls the execution of what is called an exposure bracketing image capturing and sequentially sets the exposure condition when capturing an image of the subject by the image capturing section 1. The image capturing control section 2 adjusts the shutter speed (exposure time period), the signal amplification rate (ISO sensibility value), the aperture value of the diaphragm and such like of the electronic image capturing unit 1b on the basis of a predetermined program line. Then, the image capturing control section 2, setting the correct exposure to be a reference value, for example, controls the shutter speed, the signal amplification rate, the aperture value and the like so as to be under exposure and over exposure to the reference value and makes the image capturing section 1 successively capture multiple images (a plurality of images) in nearly same compositions with the fixed focus distance (see FIGS. 4A to 4C). That is, the image capturing control section 2 makes the image capturing section 1 successively capture the multiple images altering the luminance at multiple levels in the nearly same compositions.

It is preferable that the multiple images in the nearly same compositions are captured with the apparatus main body fixed in a predetermined position by using a tripod, for example. However, positioning may be performed with the apparatus held by hand for the multiple images which are successively captured.

The image capturing control section 2 may adjust a focusing position of the lens unit 1a by shifting the electronic image capturing unit 1b, instead of the focus lens of the lens unit 1a, into the optical axial direction.

Also, the image capturing control section 2 may adjust or control the conditions such as AF (Automatic focusing processing), AE (automatic exposure processing) and AWB (Automatic white balance) for photographing the subject.

The image data generation section 3 appropriately performs gain adjustment, for each color component of RGB, of the signal which is an analog value of the frame image transferred from the electronic image capturing unit 1b, thereafter performs the sample and hold by the sample-and-hold circuit (not shown in the drawing) and converts it into digital data by an A/D converter (not shown in the drawings). Then, the image data generation section 3 performs color processing including pixel interpolation processing and γ correction processing with a color processing circuit (not shown in the drawings), and thereafter generates digital values of a luminance signal Y and chroma signals Cb and Cr (YUV data).

The luminance signal Y and the chroma signals Cb and Cr output from the color processing circuit are DMA-transferred via a DMA controller (not shown in the drawings) to the memory 4 which is used as a buffer memory.

The memory 4 is configured by including a DRAM (Dynamic random access memory), and temporarily stores data which is processed by the image processing section 6 and the central control section 9, for example.

The recording medium control section 5 is configured so that a recording medium M can be attached thereto and detached therefrom, and controls reading data from the attached recording medium M and writing data to the recording medium M.

That is, the recording medium control section 5 reads out, from the recording medium M, image data of a still image encoded according to a predetermined encoding type (JPEG format, Motion JPEG format or MPEG format, for example) and image data of a moving image consisting of multiple image frames, and transfers the read image data to the image processing section 6.

The recording medium M includes a non-volatile memory (flash memory), for example. However, the present invention is not limited to this and changes can be made appropriately.

The image processing section 6 includes a first composite image generation unit 6a, an image obtaining unit 6b, a component separation unit 6c, a first generation unit 6d, an enhancement amount obtaining unit 6e, a pixel value correction unit 6f, a correction amount adjustment unit 6g, a high frequency component obtaining unit 6h, a first data formation control unit 6i, a second generation unit 6j and a data synthesis unit 6k.

The units of the image processing section 6 are configured by including a predetermined logic circuit, for example. However, the above configuration is an example and the present invention is not limited to this.

The first composite image generation unit 6a generates an HDR composite image (see FIG. 4D) in which the dynamic range is expanded.

The first composite image generation unit (pixel addition unit) 6a performs control so as to perform pixel addition on the multiple image data obtained by the control of the image capturing control section 2, and to generate image data with the expanded dynamic range. Specifically, the first composite image generation unit 6a obtains, from the memory 4, the image data of the multiple images which were captured in the nearly same compositions altering the exposure condition (for example, correct exposure, under exposure and over exposure), adds the luminance components of the pixels corresponding to each other in these image data, and thereby generates the image data (YUV data) of an HDR composite image with the expanded dynamic range.

Since the processing of generating the image data of the HDR composite image is a well known technique, the detailed description thereof is omitted.

The image obtaining unit 6b obtains an image to be processed in an image enhancement processing (described later).

That is, the image obtaining unit (first obtaining unit) 6b obtains image data of the image to be processed. Specifically, the image obtaining unit 6b obtains the image data of the HDR composite image generated by the first composite image generation unit 6a. For example, the image obtaining unit 6b obtains, from the memory 4, a duplicate of image data (YUV data) of the HDR composite image generated by the first composite image generation unit 6a, or obtains a duplicate of the image data of the HDR composite image recorded in the recording medium M.

Note that each of the after-mentioned processing by the image processing section 6 may be performed either on the image data itself of the HDR composite image or on minified image data of a predetermined size (for example, VGA size) which is obtained by minifying the image data of the HDR composite image with a predetermined ratio as needed.

The component separation unit 6c separates components of the image to be processed.

That is, the component separation unit (separation unit) 6c separates, by component, the image data of a predetermined color space obtained by the image obtaining unit 6b. Specifically, the component separation unit 6c separates the image data of the HDR composite image obtained by the image obtaining unit 6b into a luminance component (luminance value) Y_hdr (see FIG. 5) and chroma components U_hdr and V_hdr and outputs them, for example.

Though the image data is separated into the luminance component (luminance value) Y_hdr and the chroma components U_hdr and V_hdr here, this is an example and the present invention is not limited to this. Changes can be made appropriately. For example, the image data may be separated by color component in a RGB color space, for example.

The first generation unit 6d generates multiple levels of pixel values which are respectively smoothed in multiple levels of resolutions.

That is, the first generation unit (first generation unit) 6d repeatedly performs smoothing processing and resolution conversion processing on each of the pixel values of the image data of the image to be processed which was obtained by the image obtaining unit 6b, and generates multiple levels of pixel values which are respectively smoothed in the multiple levels of resolutions. Specifically, the first generation unit 6d repeatedly performs, by using the Gaussian pyramid, the smoothing processing and the resolution conversion processing, on the luminance component (luminance value) Y_hdr of the HDR composite image which was obtained by the image obtaining unit 6b and separated by the component separation unit 6c, and generates the multiple levels of pixel values which are respectively smoothed in the multiple levels of resolutions.

For example, the first generation unit 6d sequentially repeats the smoothing processing and the resolution reduction processing on the luminance component Y_hdr of the HDR composite image, and generates n-level Gaussian pyramid Y_G_pyramid[n] (n-level Gaussian pyramid means Gaussian pyramid having n levels) of the luminance component Y_hdr. That is, in the Gaussian pyramid, the luminance component Y_hdr is smoothed to be smaller for the upper level (the level of larger value) to express the broad contrast of the luminance component Y_hdr.

Figure 5:
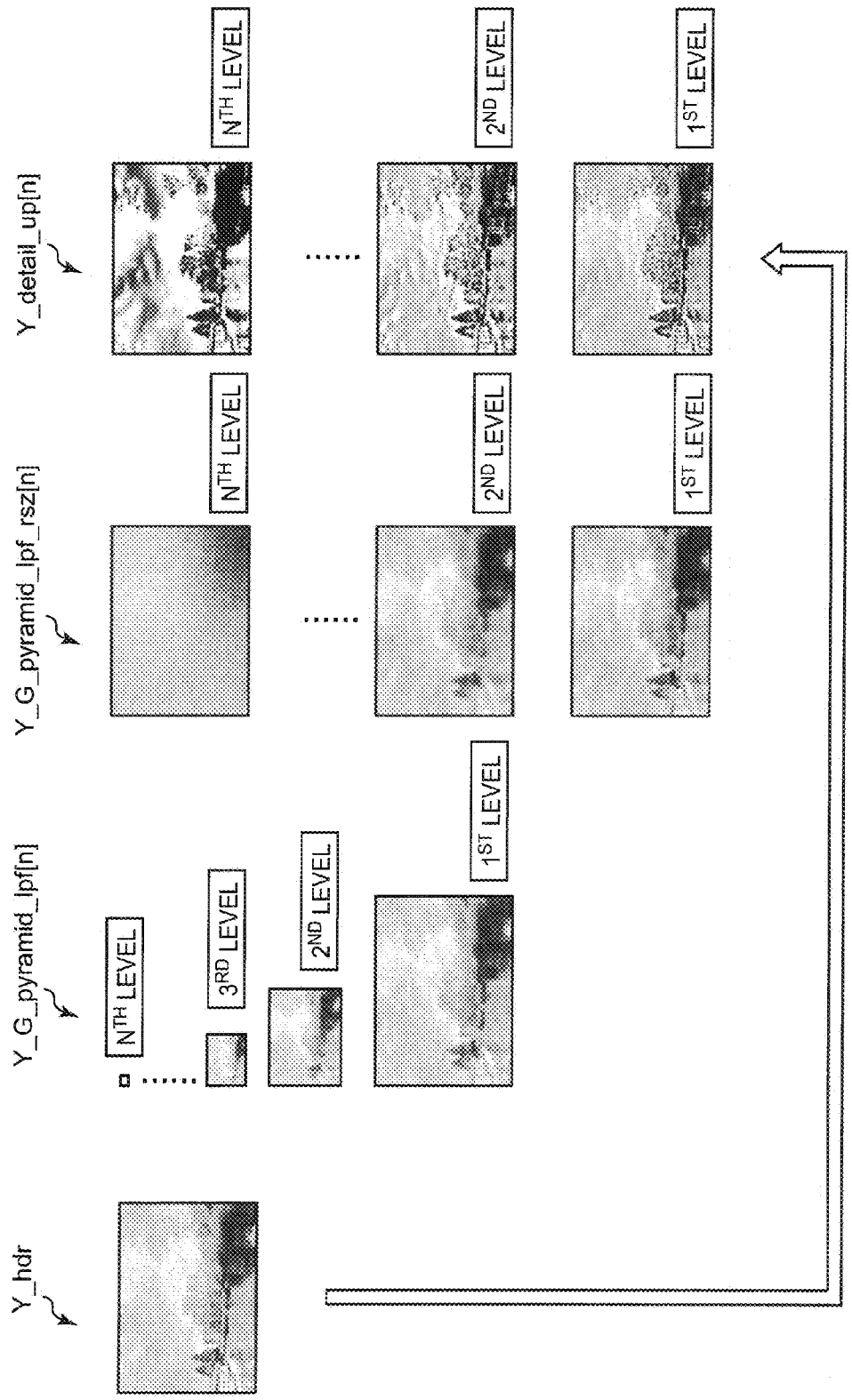
FIG. 5 is a diagram which schematically shows an example of an image according to the image capturing processing of FIG. 2.

Then, the first generation unit 6d performs smoothing by using an edge preserving filter for each level of the n-level Gaussian pyramid Y_G_pyramid[n] of the luminance component Y_hdr, and generates the n-level smoothed Gaussian pyramid Y_G_pyramid_lpf[n] (see FIG. 5). By using the edge preserving filter, only the smaller amplitude is smoothed.

Thus, in an after-mentioned correction of pixel value by the pixel value correction unit 6f, the detail of the lower frequency region is enhanced for a flat portion, and a dynamic contrast enhancement can be made in representing a sense of solidity of a large cloud, for example. Even when the Gaussian pyramid has a small number n of levels, the detail of the low frequency region can be easily enhanced.

Since the processing to generate the Gaussian pyramid is a well known technique, the detailed description thereof is omitted.

The enhancement amount obtaining unit 6e obtains an enhancement amount of the pixel value for each of the multiple levels (a plurality of levels) of resolutions.

That is, the enhancement amount obtaining unit (second obtaining unit) 6e obtains the enhancement amount of the pixel value for each of the levels on the basis of a difference between the pixel value of the image data of the image to be processed which was obtained by the image obtaining unit 6b and the pixel value for each of the levels generated by the first generation unit 6d.

Specifically, the enhancement amount obtaining unit 6e, for example, expands the data in each level of the n-level smoothed Gaussian pyramid Y_G_pyramid_lpf[n] of the luminance component Y_hdr so as to return to the original size, and generates an n-level resized smoothed Gaussian pyramid Y_G_pyramid_lpf_rsz[n] (see FIG. 5). Then, the enhancement amount obtaining unit 6e normalizes, in a range of "0" to "1", the luminance component Y_hdr for each of the pixels of the HDR composite image to be processed and the luminance component for each of the pixels of the n-level resized smoothed Gaussian pyramid Y_G_pyramid_lpf_rsz[n] of the luminance component Y_hdr, and, on the basis of the difference between them, obtains the enhancement amount of the luminance component Y_hdr for each of the levels.

The pixel value correction unit 6f corrects the pixel value for each of the multiple levels of resolutions.

That is, the pixel value correction unit (correction unit) 6f corrects the pixel value of the image data obtained for each of the levels on the basis of the difference between the pixel value of the image data of the image to be processed which was obtained by the image obtaining unit 6*b* and the pixel value for each of the levels which was generated by the first generation unit 6*d*.

Specifically, the pixel value correction unit 6*f*, for example, performs correction so as to enhance the pixel value of the luminance component Y_hdr for each of the resolutions with the enhancement amount of the luminance component Y_hdr for each of the multiple levels obtained by the enhancement amount obtaining unit 6*e*, and generates n-level enhancement luminance component Y_detail_up[n] in which the detail of the luminance component Y is enhanced (FIG. 5). Thus, in the n-level resized smoothed Gaussian pyramid Y_G_pyramid_lpf_rsz[n], for example, when the pixel value correction unit 6*f* uses the lower level in which the resolution is high and the smoothing level is low, the detail in the high frequency region is enhanced, whereas the detail of a wide range from low frequency to high frequency is enhanced when using the upper level with low resolution and high smoothing level.

The correction amount adjustment unit 6*g* adjusts a correction amount of the pixel value for each of the multiple levels of resolutions.

That is, the correction amount adjustment unit (adjustment unit) 6*g* adjusts an amount of correction by the pixel value correction unit 6*f* on the pixel value for each of the multiple levels of resolutions. Specifically, the correction amount adjustment unit 6*g* adjusts an enhancement level (degree) of each of the multiple levels of the luminance component Y_hdr obtained by the enhancement amount obtaining unit 6*e* (see FIG. 6). The adjustment of the correction amount of the pixel value may be performed at a correction level which is specified among multiple prescribed correction levels on the basis of a predetermined operation of the operation input section 8 by a user, and may be performed in a level which is arbitrarily specified by the user.

Figure 6:
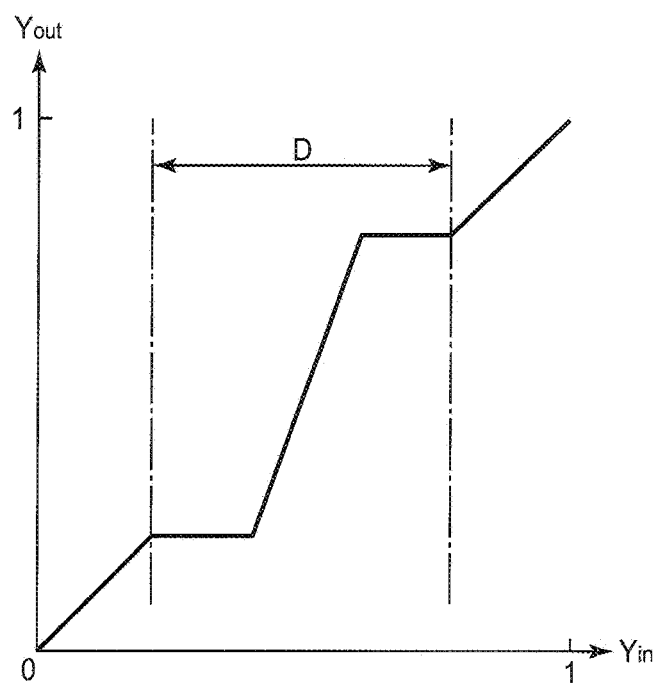
FIG. 6 is a diagram for explaining adjustment of a correction amount of a pixel value in the image enhancement processing of FIG. 3.

For example, FIG. 6 is a diagram showing a corresponding relationship between a luminance value Yin of the input image and a luminance value Yout of the output image after the enhancement. In a case of FIG. 6, the reference position (for example, center) of the Detail setting width D is determined by a value of the luminance component of each pixel of n-level resized smoothed Gaussian pyramid Y_G_pyramid_lpf_rsz[n]. Then, the correction amount adjustment unit 6*g* makes the enhancement level (gain level) larger for smaller difference between the luminance component Y_hdr for each of the pixels of the HDR composite image to be processed and the luminance component of each of the pixels of the n-level resized Gaussian pyramid Y_G_pyramid_lpf_rsz[n] of the luminance component Y_hdr. Thus, in the luminance component Y, the detail with smaller amplitude (the portion including less high frequency component) is more enhanced, and thus the detail can be expressed extensively. On the other hand, in the luminance component Y, the detail with originally large amplitude (the portion including a lot of high frequency component) is not enhanced, and thus unneeded enhancement can be suppressed.

Though broadening the Detail setting width D enables the high enhancement effect even for the high frequency component, it can be a cause of the overshoot or the undershoot at a portion having a large contrast.

The high frequency component obtaining unit 6*h* obtains high frequency components for the pixel value of each of the multiple levels.

That is, the high frequency component obtaining unit (third obtaining unit) 6*h* obtains the high frequency components in multiple levels of resolutions for the luminance component Y corrected by the pixel value correction unit 6*f* for each of the levels. Specifically, the high frequency component obtaining unit 6*h* obtains the high frequency components of the luminance component Y for each of the multiple levels by using the Laplacian pyramid.

For example, the high frequency component obtaining unit 6*h* generates an n-level Laplacian pyramid for each of the n-level enhancement luminance components Y_detail_up[n] generated by the pixel value correction unit 6*f*. That is, the high frequency component obtaining unit 6*h* generates n-level*(multiple) n-group Laplacian pyramid Y_L_pyramid_detail_up[n][n] which has n groups of n-level enhancement luminance component Y_detail_up[n] (see FIG. 7).

The processing of generating the Laplacian pyramid is a well known technique of generating the Gaussian pyramid for each level of the n-level enhancement luminance component Y_detail_up[n] and obtaining the difference between neighboring levels. Thus, the detailed explanation thereof is omitted.

The first data formation control unit 6*i* forms image data in which the pixel value is enhanced.

That is, the first data formation control unit (control unit) 6*i* performs control so as to form the image data enhancing the pixel value of the obtained image data, by utilizing the high frequency component, which corresponds to the resolution of each of the levels, of the image data for each of the levels which has the pixel value corrected by the pixel value correction unit 6*f*. Specifically, the first data formation control unit 6*i* specifies a high frequency component corresponding to the resolution of the pixel value corrected by the pixel value correction unit 6*f* among the multiple levels of high frequency components obtained by the high frequency component obtaining unit 6*h*, and performs control to form the image data in which the pixel value is enhanced.

For example, the first data formation control unit 6*i* selects a layer image (luminance component Y) by one level from each of the groups of the n-level*(multiple) n-group Laplacian pyramid Y_L_pyramid_detail_up[n][n] obtained by the high frequency component obtaining unit 6*h*, and generates the n-level Laplacian pyramid Y_L_pyramid_final[n] (see FIG. 7). The selection method here is selecting the layer image in the level which has the same value as the value of the group for each of the groups. For example, the first data formation control unit 6*i* selects the second level layer image Y_L_pyramid_detail_up[2] [2] from Y_L_pyramid_detail_up[n] [2] which is the second group. Finally, the first data formation control unit 6*i* obtains the duplicate of the $n^{th}$ level layer image of the n-level Gaussian pyramid Y_G_pyramid [n], incorporates it into the uppermost level and generates the n-level Laplacian pyramid Y_L_pyramid_final[n].

Thus, in the n-level Laplacian pyramid Y_L_pyramid_final[n], the detail component of high frequency region is stored in the lower level, the detail component being enhanced by using the lower level of the n-level resized smoothed Gaussian pyramid Y_G_pyramid_lpf_rsz[n] in the correction of the pixel value by the pixel value correction unit 6*f*. The detail component extracting only the portion corresponding to the middle range from the detail component from middle to high frequency region is stored in the middle level, the detail component being enhanced by using the middle level of the n-level resized smoothed Gaussian pyramid Y_G_pyramid_lpf_rsz[n]. The detail component extracting only the portion corresponding to the lower region from the detail component of low to high frequency region is stored in the upper level, the detail component being enhanced by using the upper level of the n-level resized smoothed Gaussian pyramid Y_G_pyramid_lpf_rsz[n]. That is, detail components of various frequency regions which are enhanced in the correction of the pixel values by the pixel value correction unit 6f are stored in the n-level Laplacian pyramid Y_L_pyramid_final[n] without overlapping each other in the frequency regions.

In addition, the first data formation control unit 6i re-forms the n-level Laplacian pyramid Y_L_pyramid_final[n] and generates the luminance component Y_final (luminance image data) (see FIG. 7). For example, the first data formation control unit 6i uses the general method of repeating the procedure of "expansion" and "addition" in order from the layer image of the upper level to re-form the Laplacian pyramid Y_L_pyramid_final[n], and completes the luminance component Y_final.

The second generation unit 6j generates the chroma image data in which the chroma components are enhanced.

That is, the second generation unit (second generation unit) 6j generates the chroma image data enhancing the chroma components U_hdr and V_hdr separated by the component separation unit 6c, on the basis of enhancement degree of the luminance value in the image data formed by the first data formation control unit 6i. Specifically, for example, the second generation unit 6j amplifies the values of the chroma components U_hdr and V_hdr in the nearly same degree as the enhancement amount of the luminance component Y_hdr obtained by the enhancement amount obtaining unit 6e, and completes the chroma components U_final and V_final (chroma image data) (not shown in the drawings).

The enhancement amount of the luminance component Y_hdr may be an enhancement amount corresponding to any one level among the enhancement amounts of the luminance components Y_hdr for the multiple levels, and may be an enhancement amount calculated by a predetermined arithmetic on the basis of the enhancement amounts corresponding to multiple levels.

The data synthesis unit 6k synthesizes the luminance image data and the chroma image data.

That is, the data synthesis unit (synthesis unit) 6k synthesizes the luminance component Y_final formed by the first data formation control unit 6i and the chroma components U_final and V_final generated by the second generation unit 6j, and generates the image data of the image-processed image HDR_final (see FIG. 8A).

The display section 7 includes a display panel 7a and a display control unit 7b.

The display panel 7a displays an image on a display screen. A liquid crystal display and an organic EL display panel are the display panel 7a, for example. However, theses are examples and the present invention is not limited to them.

The display control unit 7b reads out the image data for display which is temporarily stored in the memory 4, and performs control to display a predetermined image on the display screen of the display panel 7a on the basis of the image data of the predetermined size which is decoded by the image processing section 6. Specifically, the display control unit 7b includes a VRAM (Video random access memory), a VRAM controller, a digital video encoder and such like (none of them shown in the drawings). The digital video encoder reads out the luminance signal Y and the chroma signals Cb and Cr, which were decoded by the image processing section 6 and are stored in the VRAM, in a predetermined reproduction frame rate (for example, 30 fps) from the VRAM via the VRAM controller, generates video signals on the basis of these data and outputs the signals to the display panel 7a.

For example, in a still image capturing mode or in a moving image capturing mode, the display control unit 7b displays a live view image G on the display panel 7a while sequentially updating, in a predetermined frame rate, multiple frame images generated by the image capturing of the subject by the image capturing section 1 and the image capturing control section 2. In addition, the display control unit 7b displays an image (rec view image) recorded as a still image on the display panel 7a and displays an image being recorded as a moving image on the display panel 7a.

The operation input section 8 is for performing a predetermined operation of the image capturing apparatus 100. Specifically, the operation input section 8 includes operation units such as a shutter button according to an image capturing instruction of the subject, a selection decision button according to a selection instruction of image capturing modes, functions and such like, a zoom button according to an adjustment instruction of zoom amount and such like (none of them shown in the drawings), and outputs a predetermined operation signal to the central control section 9 in accordance with the operations of the buttons of the operation units.

The central control section 9 controls the sections of the image capturing apparatus 100. Specifically, the central control section 9 includes a CPU (Central processing unit) and such like not shown in the drawings, and performs carious control operations in accordance with various processing programs (not shown in the drawings) for the image capturing apparatus 100.

<Image Capturing Processing>

Next, the image capturing processing by the image capturing apparatus 100 will be described with reference to FIGS. 2 to 8A-8F.

Figure 2:
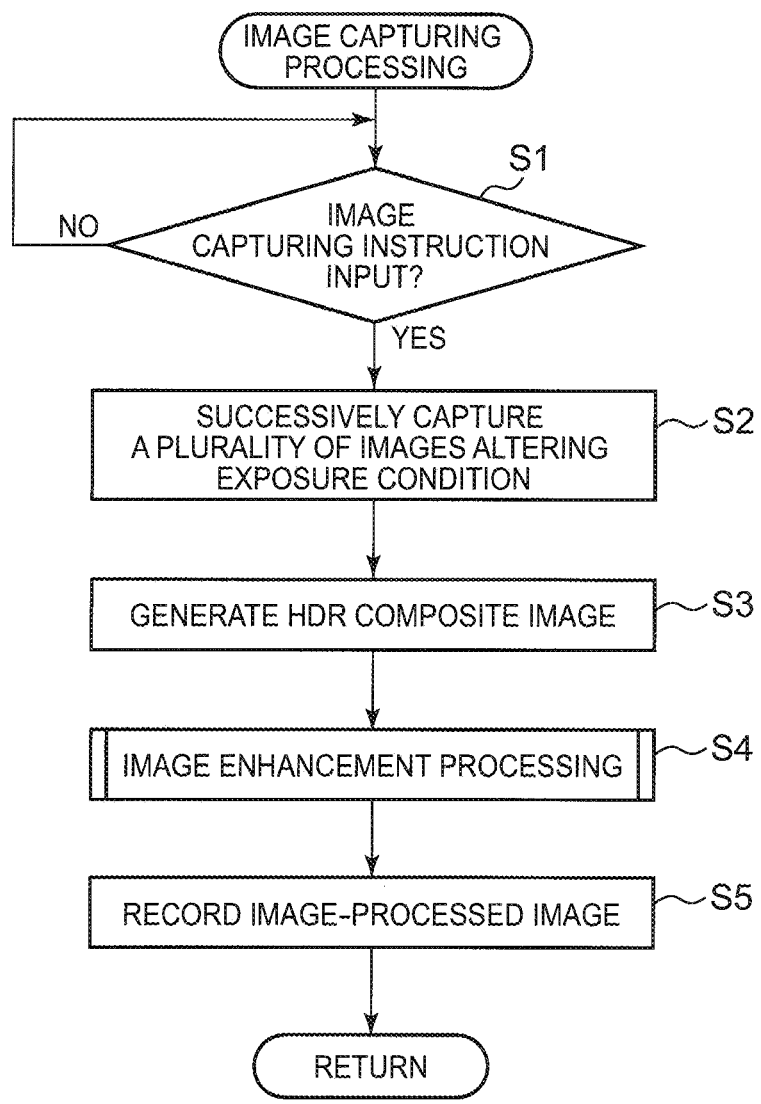
FIG. 2 is a flowchart showing an example of operations according to image capturing processing by the image capturing apparatus of FIG. 1.

FIG. 2 is a flowchart showing an example of operations according to the image capturing processing.

The image capturing processing is executed by the sections of the image capturing apparatus 100 under the control of the central control section 9 in a case where an enhancement image capturing mode is selected and instructed among the multiple operation modes displayed on the menu screen, on the basis of a predetermined operation of a selection decision button of the operation input section 8 by the user.

As shown in FIG. 2, first, the CPU in the central control section 9 determines whether the image capturing instruction is input on the basis of the predetermined operation of the shutter button of the operation input section 8 by the user (step S1). The determination of whether the image capturing instruction is input in step S1 is repeatedly executed at intervals of a predetermined time period until it is determined that the image capturing instruction is input (step S1; YES).

In step S1, if it is determined that the image capturing instruction is input (step S1; YES), the CPU in the central control section 9 outputs an image capturing control instruction to the image, capturing control section 2, and the image capturing control section 2 controls the image capturing section 1 so as to successively capture multiple images altering the exposure condition (step S2; see FIGS. 4A-4C). Specifically, when setting the correct exposure as a reference value, for example, the image capturing control section 2 makes the image capturing section 1 successively capture multiple (three, for example) images in the nearly same compositions with a focus distance being fixed by controlling the shutter speed, signal amplification rate, the aperture value and the like so as to be under exposure and over exposure to the reference value. Then, the image data generation section 3 generates the image data of the images which were successively captured, and outputs the image data to the memory 4.

Figure 4D:
Figure 4B:
Figure 4C:

Next, the first composite image generation unit 6a of the image processing section 6 obtains, from the memory 4, the image data of the images which were successively captured, adds the luminance components of the pixels corresponding to each other in these image data and thereby generates the image data (YUV data) of the HDR composite image shown in FIG. 4D, in which the dynamic range is expanded (step S3).

Then, the image processing section 6 performs image enhancement processing (see FIG. 3) enhancing the detail and contrast of the HDR composite image (step S4).

Figure 3:
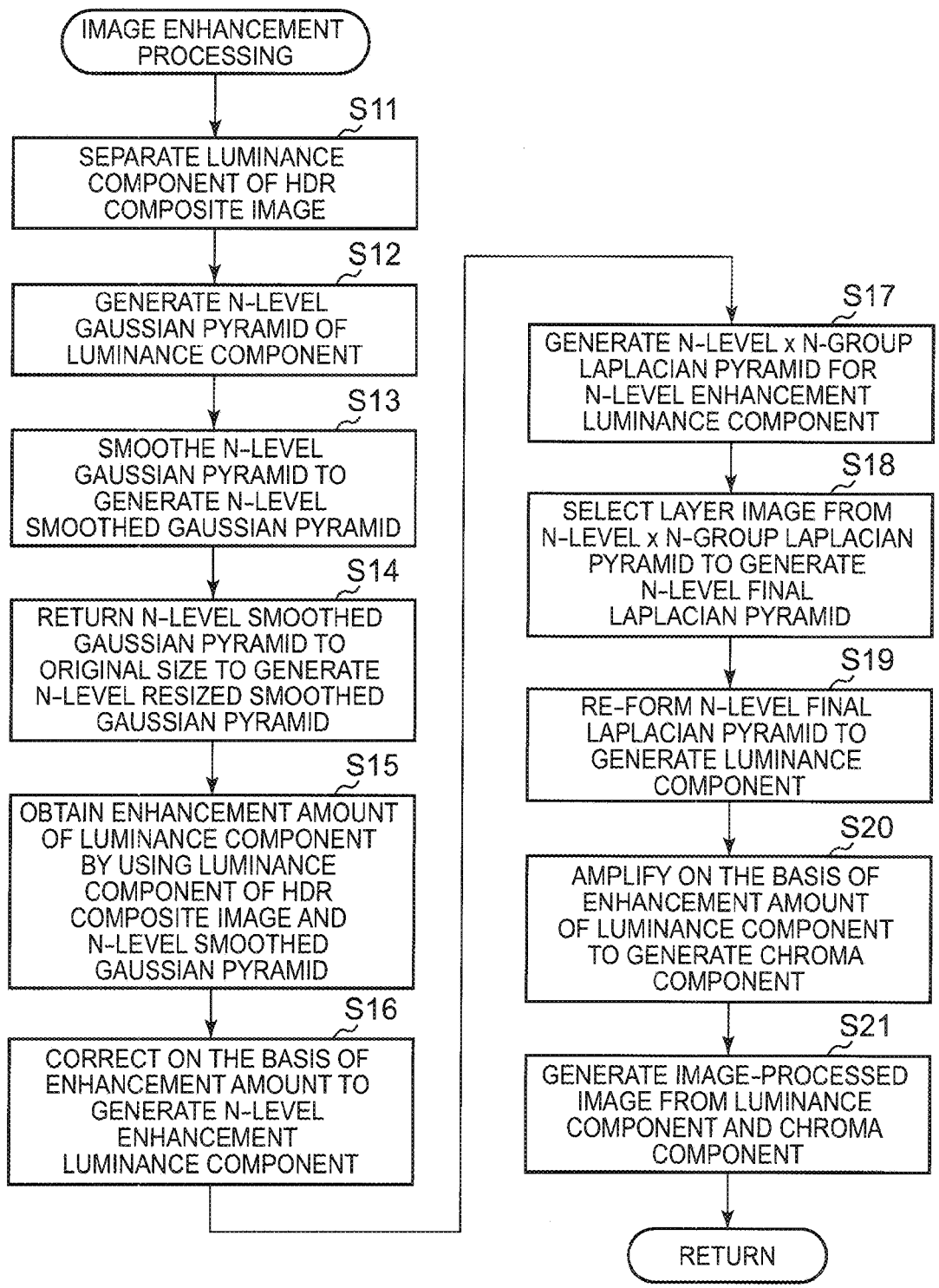
FIG. 3 is a flowchart showing an example of operations according to image enhancement processing in the image capturing processing of FIG. 2.

Hereinafter, the image enhancement processing will be described with reference to FIG. 3. FIG. 3 is a flowchart showing an example of operations according to the image enhancement processing.

As shown in FIG. 3, first, the image obtaining unit 6b of the image processing section 6 obtains the duplicate of the image data of the HDR composite image generated by the first composite image generation section 6, and the component separation unit 6c separates the image data of the HDR composite image into the luminance component (luminance value) Y_hdr (see FIG. 5) and the chroma components U_hdr and V_hdr (step S11).

Next, the first generation unit 6d sequentially repeats the smoothing processing and the resolution reduction processing on the luminance component Y_hdr of the HDR composite image, and generates the n-level Gaussian pyramid G_pyramid[n] of the luminance component Y_hdr (step S12). Then, the first generation unit 6d performs smoothing for each of the levels of the n-level Gaussian pyramid Y_G_pyramid[n] of the luminance component Y_hdr and generates the n-level smoothed Gaussian pyramid Y_G_pyramid_lpf[n] (step S13; see FIG. 5).

Then, the enhancement amount obtaining unit 6e returns each of the n-level smoothed Gaussian pyramid Y_G_pyramid_lpf[n] of the luminance component Y_hdr generated by the first generation unit 6d to its original size, and generates the n-level resized smoothed Gaussian pyramid Y_G_pyramid_lpf_rsz[n] (step S14; see FIG. 5). Then, the enhancement amount obtaining unit 6e normalizes, in a range of a value of "0" to "1", the luminance component Y_hdr of each of the pixels of the HDR composite image and the luminance component of each of the pixels of the n-level resized smoothed Gaussian pyramid Y_G_pyramid_lpf_rsz[n] of the luminance component Y_hdr, and obtains the enhancement amount of each of the levels of the luminance component Y_hdr on the basis of the difference between them (step S15).

The pixel value correction unit 6f corrects the luminance component Y_hdr for each of the resolutions on the basis of the enhancement amount for each of the multiple levels of the luminance component Y_hdr obtained by the enhancement amount obtaining unit 6e, and generates the n-level enhancement luminance component Y_detail_up[n] (step S16; see FIG. 5).

The high frequency component obtaining unit 6h generates the n-level*(multiple) n-group Laplacian pyramid Y_L_pyramid_detail_up[n][n] which has n groups of n-level enhancement luminance component Y_detail_up[n] generated by the pixel value correction unit 6f (step S17; see FIG. 7).

The first data formation control unit 6i selects a layer image (luminance component Y) by one level from each of the groups of the n-level*(multiple) n-group Laplacian pyramid Y_L_pyramid_detail_up[n][n] obtained by the high frequency component obtaining unit 6h, incorporates the duplicate of the n-th layer image of the n-level Gaussian pyramid Y_G_pyramid[n] into the uppermost level, and generates the n-level Laplacian pyramid Y_L_pyramid_final[n] (step S18; see FIG. 7). Then, the first data formation control unit 6i re-forms the layer image by performing "expansion", "addition" and such like in order from the upper level of the n-level Laplacian pyramid Y_L_pyramid_final[n], and generates the luminance component Y_final (step S19; see FIG. 7).

The second generation unit 6j amplifies the values of the chroma components U_hdr and V_hdr in the nearly same degree as the enhancement amount of the luminance component Y_hdr obtained by the enhancement amount obtaining unit 6e, and generates the chroma components U_final and V_final (step S20).

The data synthesis unit 6k synthesizes the luminance component Y_final and the chroma components U_final and V_final, and generates the image data of the image-processed image HDR_final (step S21; see FIG. 8A). The image processing section 6 encodes the image data of the image-processed image HDR_final in a predetermined compression format, and outputs the data to the memory 4.

Returning to FIG. 2, the recording medium control section 5 obtains, from the memory 4, the image data of the image-processed image HDR_final after the encoding processing, and records the data in a predetermined storage area of the recording medium M (step S5).

Then, the image capturing processing ends.

As described above, according to the image capturing apparatus 100 of the embodiment 1, on the basis of the difference between the pixel value (for example, luminance value) of the image data of the obtained image and the pixel values of the multiple levels obtained by smoothing the image data of the obtained image in multiple levels of resolutions, the pixel value of the image data obtained for each of the levels is corrected, high frequency component corresponding to the resolution of each of the levels of the image data having the corrected pixel value is utilized, and the image data enhancing the pixel value of the obtained image data can be formed.

Specifically, by using the Gaussian pyramid, the smoothing processing and the resolution conversion processing are repeatedly performed on the pixel value of the image data of the obtained image, and pixel values of multiple levels which are smoothed in multiple levels of resolutions can be generated. At that time, by performing the smoothing processing with the edge preserving filter in multiple levels of resolutions, the contrast of the low frequency region can be easily enhanced with a smaller number of levels. Also, on the basis of the difference between the pixel value of the image data of the obtained image and the pixel value of the multiple levels which are obtained by smoothing the image data of the obtained image in multiple levels of resolutions, the enhancement amount of the pixel value of each of the levels is obtained, and correction to enhance the pixel value of the image data obtained for each of the levels can be performed by the obtained enhancement amount. Also, by using the Laplacian pyramid, the high frequency component can be obtained in multiple levels of resolutions for the corrected pixel value for each of the levels, and among the obtained high frequency components of multiple levels, a high frequency component corresponding to the resolution of the corrected pixel value is specified, and the image data enhancing the pixel value can be formed.

Accordingly, increasing the resolution level of the frequency according to the image processing to the obtained image, it is possible to perform the enhancement processing which is more appropriate than usual not only on the image area corresponding to the details (see FIGS. 8C and 8D) of the obtained image, but also on the image area corresponding to the flat portion (for example, cloud; see FIGS. 8E and 8F) in which the difference in contrast is less noticeable. Thus, appropriate image processing can be performed regardless the degree of the difference in contrast of the obtained image.

Note that FIGS. 8C and 8E show the images in which conventional image processing is performed, and FIGS. 8D and 8F show the images in which the image enhancement processing according to the embodiment is performed.

Furthermore, since the correction amount of the smoothed pixel values in multiple levels can be adjusted, the pixel values in multiple levels can be corrected in a correction degree desired by the user, and the enhancement degree of the detail and contrast of the image-processed image can be changed.

Also, on the basis of the enhancement degree of the luminance value, the chroma image data enhancing the chroma component is generated, and the luminance image data enhancing the luminance value and the chroma image data are synthesized. Thus, saturation can also be enhanced in addition to the luminance of the obtained image, and the expression of the detail and contrast of the image-processed image can be improved.

Also, by using, as image data of the obtained image, the image data which is obtained by performing pixel addition on the images in the nearly same compositions with the different luminance in multiple levels to expand the dynamic range, it is possible to perform more appropriately the expression with the expanded dynamic range of the image-processed image. Specifically, it is possible to generate the image data with expanded dynamic range by performing pixel addition on the multiple image data obtained by controlling the image capturing section 1 so as to capture the image multiple times in the nearly same compositions altering the exposure condition.

Embodiment 2

Hereinafter, an image capturing apparatus 200 of the embodiment 2 will be described.

The image capturing apparatus 200 of the embodiment 2 has a nearly same configuration as that of the image capturing apparatus 100 of the embodiment 1 excepts for the points which will be described in detail below, and thus the detailed explanation thereof is omitted.

Figure 9:
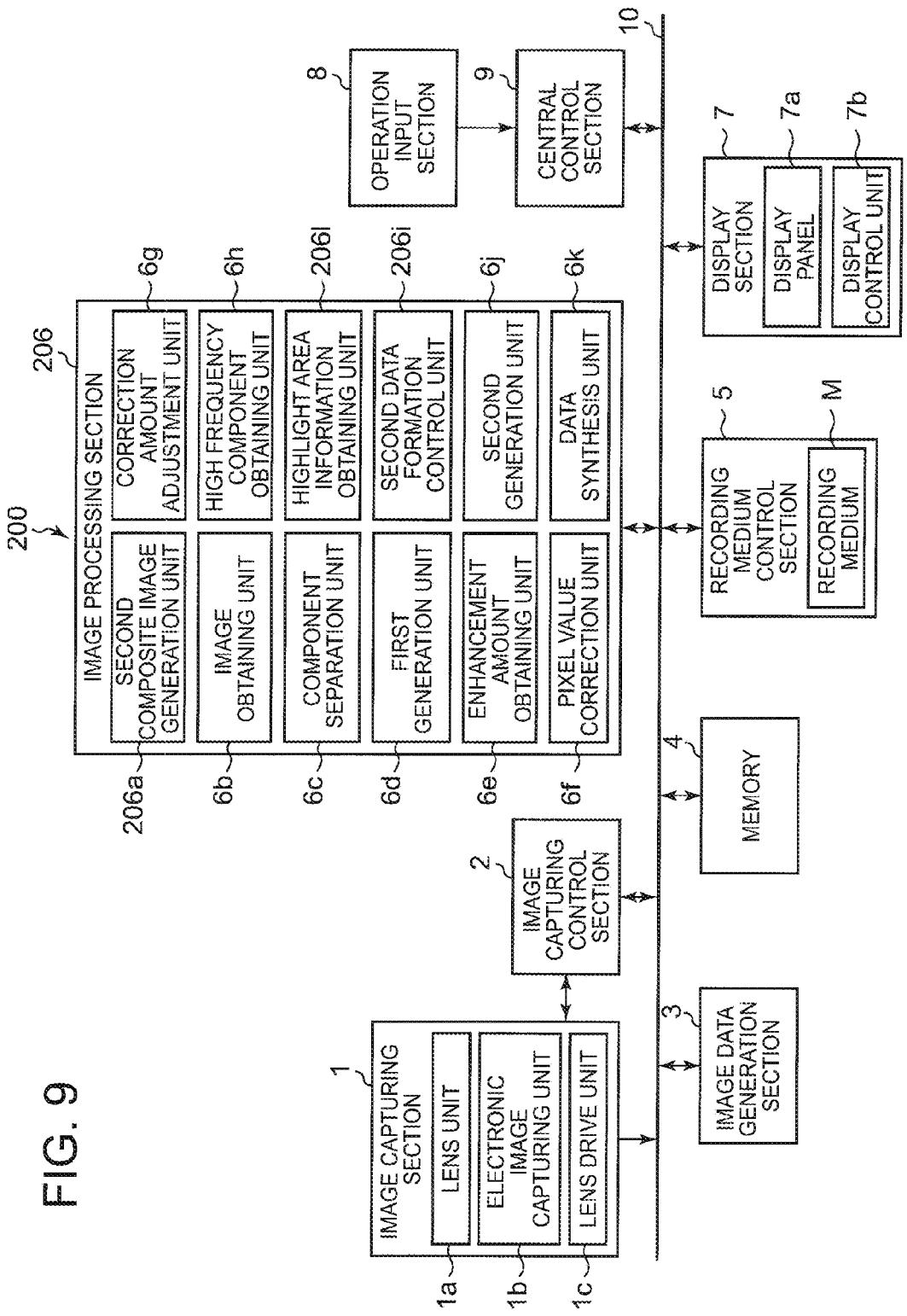
FIG. 9 is a block diagram showing a schematic configuration of an image capturing apparatus of an embodiment 2 to which the present invention is applied.

FIG. 9 is a block diagram showing a schematic configuration of the image capturing apparatus 200 of the embodiment 2 to which the present invention is applied.

As shown in FIG. 9, an image processing section 206 of the image capturing apparatus 200 of the embodiment 2 includes a second composite image generation unit 206a, an image obtaining unit 6b, a component separation unit 6c, a first generation unit 6d, an enhancement amount obtaining unit 6e, a pixel value correction unit 6f, a correction amount adjustment unit 6g, a high frequency component obtaining unit 6h, a highlight area information obtaining unit 206l, a second data formation control unit 206i, a second generation unit 6j and a data synthesis unit 6k.

The image obtaining unit 6b, the component separation unit 6c, the first generation unit 6d, the enhancement amount obtaining unit 6e, the pixel value correction unit 6f, the correction amount adjustment unit 6g, the high frequency component obtaining unit 6h, the second generation unit 6j and the data synthesis unit 6k respectively have the nearly same configuration and processing as those included in the image capturing apparatus 100 of the embodiment 1, and thus the detailed explanation thereof is omitted.

The second composite image generation unit 206a, similar to the first composite image generation unit 6a included in the image capturing apparatus 100 of the embodiment 1, generates the HDR composite image (see FIG. 4D) which is obtained by expanding the dynamic range.

Hereinafter, with reference to FIG. 10, the second composite image generation unit 206a will be described in detail.

Figure 10:
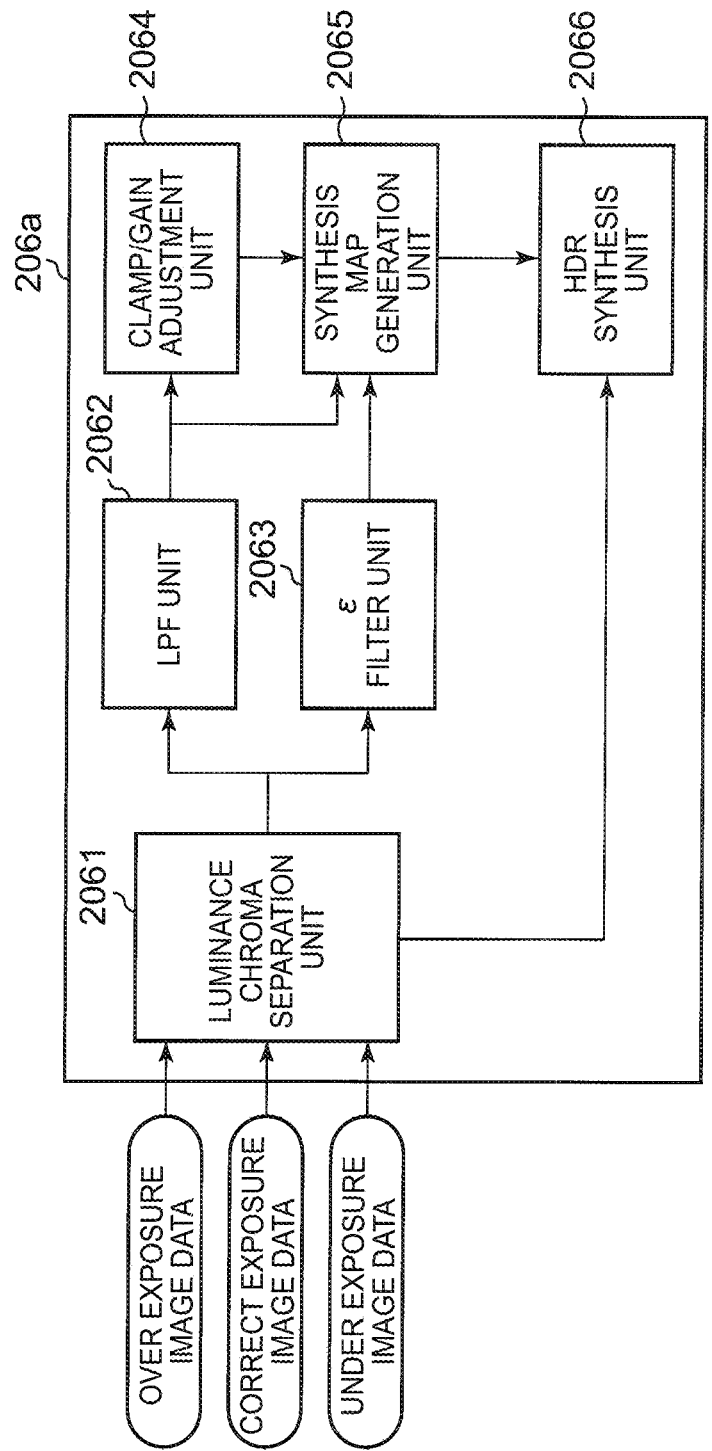
FIG. 10 is a block diagram showing a schematic configuration of a second composite image generation unit included in the image capturing apparatus of FIG. 9.

FIG. 10 is a block diagram showing the schematic configuration of the second composite image generation unit 206a.

As shown in FIG. 10, the second composite image generation unit 206a includes a luminance chroma separation unit 2061, an LPF unit 2062, an ε filter unit 2063, a clamp/gain adjustment unit 2064, a synthesis map generation unit 2065 and an HDR synthesis unit 2066.

The luminance chroma separation unit 2061 obtains each of the data at correct exposure, at under exposure and at over exposure from the memory 4, separates the data into the luminance component data and the chroma component data and outputs them to the HDR synthesis unit 2066.

Also, the luminance chroma separation unit 2061 generates the duplicate of the luminance component data of the image data at correct exposure and outputs it to the LPF unit 2062 and the ε filter unit 2063.

The LPF unit 2062 performs leveling by employing a law pass filter to the luminance component data of the image data at correct exposure.

That is, the LPF unit (information image generation unit) 2062 generates an information image (gradation image) showing a broad trend of the luminance component of any one of the image data (the image data at correct exposure in the embodiment) among the multiple image data obtained by the control of the image capturing control section 2. Specifically, the LPF unit 2062 employs the law pass filter to the luminance component data of the image data at correct exposure, generates the gradation image regarding the broad luminance gradient (the trend of luminance) of the entire image, and outputs the gradation image to the clamp/gain adjustment unit 2064 and the synthesis map generation unit 2065.

The (epsilon) filter unit 2063 employs, to the luminance component data of the image data at correct exposure, ε filter for smoothing the data and removing noises. Then, the ε filter unit 2063 outputs the smoothed luminance component data to the synthesis map generation unit 2065.

The clamp/gain adjustment unit 2064 performs processing of increasing the luminance value for the predetermined luminance range of the gradation image. That is, the clamp/gain adjustment unit 2064 makes the gradation image less influence the shadow portion the larger the clamp (subtraction) level of the luminance value is, while making the gradation image more influence the highlight portion for a larger gain level of the luminance value.

This enables dynamic contrast enhancement expression for the HDR composite image generated by the HDR synthesis unit 2066.

The synthesis map generation unit 2065 generates the synthesis map which adjusts the pixel addition ratio of each of the image data at correct exposure, at under exposure and at over exposure.

That is, the synthesis map generation unit (ratio adjustment unit) 2065 adjusts the pixel addition ratio of multiple image data by the HDR synthesis unit (pixel addition unit) 2066 by using the information image (gradation image) generated by the LPF unit 2062. Specifically, the synthesis map generation unit 2065 performs blending (synthesis in pixel level) on the image data of the gradation image generated by the LPF unit 2062, the luminance component data smoothed by the filter unit 2063 and the image data of the gradation image in which the luminance value is increased in a predetermined luminance range by the clamp/gain adjustment unit 2064, and generates the synthesis map.

The HDR synthesis unit 2066 synthesizes the image data at correct exposure, at under exposure and at over exposure according to the synthesis map generated by the synthesis map generation unit 2065. That is, the HDR synthesis unit

2066 generates the image data of the HDR composite image with expanded dynamic range, by setting the mixture ratio so that the image data at over exposure, the image data at correct exposure and the image data at under exposure are main portions for the low luminance value area (black area), for the grey area, and for the high luminance value area (white area), respectively.

The above generation in the HDR synthesis unit 2066 is performed separately for the luminance component data and the chroma component data for each of the image data at correct exposure, at under exposure and at over exposure, and thereafter the synthesized luminance component data and the chroma component data are synthesized.

Figure 11:
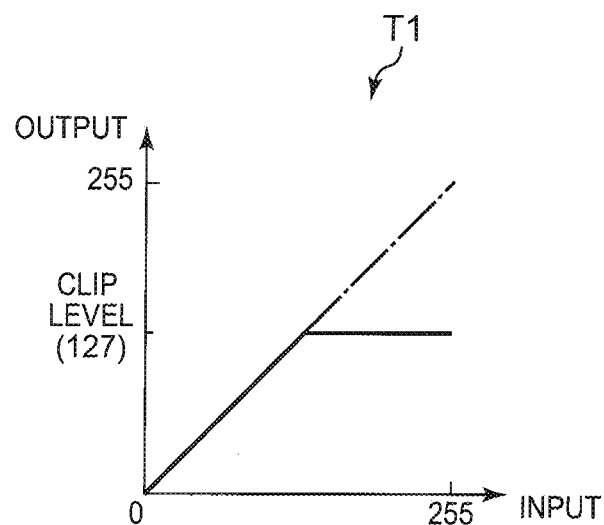
FIG. 11 is a diagram schematically showing a clip table.

The highlight area information obtaining unit 2061 obtains a clip table T1 (see FIG. 11) for clipping the highlight area of the luminance component.

That is, the highlight area information obtaining unit (information obtaining unit) 2061 obtains information specifying the highlight area of the image data from one of the multiple levels of pixel values generated by the first generation unit 6d. Specifically, the highlight area information obtaining unit 2061 obtains, from a predetermined storage means (for example, the memory 4), the clip table T1 specifying the highlight area of the luminance component data generated from the $n^{th}$ level layer image of n-level Gaussian pyramid Y_G_pyramid[n] of the luminance component Y_hdr generated by the first generation unit 6d, that is, from the part of the pyramid which is lowest in resolution.

The clip table T1 is a table for adjusting so that the area which has luminance of 127 or more in intensity (luminance level) represented in 256 levels is not brighter than the current luminance in the $n^{th}$ level layer image of the n-level Gaussian pyramid Y_G_pyramid[n] of the luminance component Y_hdr.

Though the $n^{th}$ level layer image of the n-level Gaussian pyramid Y_G_pyramid[n] of the luminance component Y_hdr is described as the subject of the clip processing using the clip table T1, this is an example and the present invention is not limited to this. Changes can be appropriately made arbitrarily such as change to the layer image which is not $n^{th}$ level.

The second data formation control unit 206i forms image data in which the pixel value is enhanced, similarly to the first data formation control unit 6i included in the image capturing apparatus 100 of the embodiment 1.

That is, the second data formation control unit 206i controls so as to form the image data in which the pixel value of the obtained image data is enhanced, by utilizing data in which the luminance is reduced for an area having luminance of a predetermined level or more in the $n^{th}$ level layer image of the n-level Gaussian pyramid Y_G_pyramid[n] of the luminance component Y_hdr by using the clip table T1 obtained by the highlight area information obtaining unit 2061, in addition to the high frequency component corresponding to the resolution of each of the levels of the image data for each of the levels having the pixel value corrected by the pixel value correction unit 6f.

Specifically, for example, the second data formation control unit 206i, similarly to the first data formation control unit 6i, selects one level of the layer image (luminance component Y) from each of the groups of the n-level*(multiple) n-group Laplacian pyramid Y_L_pyramid_detail_up[n][n] obtained by the high frequency component obtaining unit 6h, and generates the n-level Laplacian pyramid Y_L_pyramid_final[n] (see FIG. 7). Here, the second data formation control unit 206i obtains the duplicate of the $n^{th}$ level layer image of the n-level Gaussian pyramid Y_G_pyramid[n] of the luminance component Y_hdr, performs conversion of the luminance value by using the clip table T1, and thereby generates a highlight clip image in which the luminance is reduced for the area having luminance of a predetermined level or more (127 or more of the 256 levels) of the layer image. Then, the second data formation control unit 206i incorporates the generated highlight clip image into the uppermost level and generates the n-level Laplacian pyramid Y_L_pyramid_final[n].

The highlight clip image is an image obtained by reducing the luminance value of the area in which the luminance value is a predetermined level or more, for the $n^{th}$ level layer image of the n-level Gaussian pyramid Y_G_pyramid[n] of the luminance component Y_hdr. Thus, when the second data formation control unit 206i re-forms the n-level Laplacian pyramid Y_L_pyramid_final[n], it is possible to suppress the broad enhancement of the luminance of the luminance component Y_final (see FIG. 7).

<Image Capturing Processing>

Next, the image capturing processing by the image capturing apparatus 200 of the embodiment 2 will be described with reference to FIG. 2.

The image capturing processing is nearly similar to the image capturing processing by the image capturing apparatus 100 of the embodiment 1 except for the points described in detail hereinafter, and thus the detailed explanation thereof is omitted.

That is, nearly similar to the image capturing processing of the embodiment 1, in step 1, if it is determined that the image capturing instruction is input (step S1; YES), the CPU of the central control section 9 outputs the image capturing control instruction to the image capturing control section 2, and the image capturing control section 2 controls the image capturing section 1 so as to successively capture the image a plurality of times altering the exposure condition (step S2; see FIGS. 4A to 4C).

Next, the second composite image generation unit 206a of the image processing section 206 obtains, from the memory 4, the image data of the images which were successively captured, adds the luminance components of the pixels corresponding to each other in these image data, and thereby generates the image data (YUV data) of the HDR composite image with the expanded dynamic range (step S3).

Specifically, the luminance chroma separations unit 2061 of the second composite image generation unit 206a obtains, from the memory 4, each of the image data at correct exposure, at under exposure and at over exposure, separates the data into the luminance component data and the chroma component data, outputs the data into the HDR synthesis unit 2066, generates the duplicate of the luminance component data of the image data at correct exposure, and outputs the duplicate to the LPF unit 2062 and ϵ filter unit 2063.

Then, the LPF unit 2062 performs flattening of employing the law pass filter to the luminance component data of the image data at correct exposure, generates the gradation image regarding the broad luminance gradient of the entire image, and outputs the image to the clamp/gain adjustment unit 2064 and the synthesis map generation unit 2065.

Then, the ϵ filter unit 2063 employs the ϵ filter to the luminance component data of the image data at correct exposure, and outputs the smoothed luminance component data to the synthesis map generation unit 2065.

The clamp/gain adjustment unit 2064 increases the luminance value for the predetermined luminance range of the gradation image.

Then, the synthesis map generation unit 2065 performs blending of the image data of the gradation image, the smoothed luminance component data and the image data of the gradation image in which the luminance value is increased for the predetermined luminance range, to generate the synthesis map.

Thereafter, the HDR synthesis unit 2066, in accordance with the synthesis map generated by the synthesis map generation unit 2065, synthesizes the image data of correct exposure, under exposure and over exposure, and generates the image data of the HDR composite image with expanded dynamic range.

Next, the image processing section 206 performs image enhancement processing (see FIG. 3) of enhancing the detail and contrast of the HDR composite image (step S4).

Image enhancement processing is nearly similar to the image enhancement processing of the embodiment 1 except for the points described in detail hereinafter, and thus the detailed explanation thereof is omitted.

That is, the image processing section 206, nearly similar to the image enhancement processing of the embodiment 1, performs processing of steps S11 to S17. Then, in step S18, the highlight area information obtaining unit 2061 obtains the clip table T1 specifying the highlight area of the $n^{th}$ level layer image of the n-level Gaussian pyramid Y_G_pyramid[n] of the luminance component Y_hdr, and thereafter the second data formation control unit 206i obtains the duplicate of the $n^{th}$ level layer image of the n-level Gaussian pyramid Y_G_pyramid[n] of the luminance component Y_hdr, performs conversion of the luminance value by using the clip table T1, and thereby generates the highlight clip image in which the luminance is reduced for the area having the luminance of predetermined level or more (127 or more in the 256 levels) of the layer image. Then, the second data formation control unit 206i selects one level of the layer image (luminance component Y) from each of the groups of the n-level* (multiple) n-group Laplacian pyramid Y_L_pyramid_detail_up[n][n] obtained by the high frequency component obtaining unit 6h, incorporates the highlight clip image into the uppermost level, and generates the n-level Laplacian pyramid Y_L_pyramid_final[n].

Thereafter, the image processing section 206, nearly similar to the image enhancement processing of the embodiment 1, performs processing of steps S19 to S21, and thereby generates the image data of the image-processed image HDR_final.

Back to FIG. 2, nearly similar to the image capturing processing of the embodiment 1, the recording medium control section 5 obtains, from the memory 4, the image data of the image-processed image HDR_final after encoding processing, and records the data in a predetermined storage area of the recording medium M (step S5).

Thus, the image capturing processing by the image capturing apparatus 200 of the embodiment 2 ends.

As described above, according to the image capturing apparatus 200 of the embodiment 2, the broad gradation of the entire image can be applied only to the highlight portion of the synthesis map since the pixel addition ratio of the plurality of image data is adjusted by using the gradation image regarding the broad luminance gradient (trend of luminance) of the entire image. Furthermore, by utilizing the data (highlight clip image) in which the luminance for an area having luminance of predetermined level or more in the image data is reduced by using the clip table T1, in addition to the high frequency component corresponding to the resolution of each of the levels of the image data of each of the levels having the corrected pixel values, it is possible to form data enhancing the pixel value of the obtained image data, and to reduce the luminance of the highlight portion (cloud, for example) in the image-processed image HDR_final to enhance the depth of the color of the highlight portion.

Accordingly, while minimizing the influence such as the reduction of dynamic range by the shadow portion being filled to be black in the image-processed image HDR_final, more dynamic contrast enhancement expression can be performed on the highlight portion. As a result, the luminance and the darkness can be easily inversed between the highlight portion and the shadow portion, and unreal feeling of the image-processed image HDR_final can be expressed more appropriately.

The embodiment 2, performs both of the processing adjusting the pixel addition ratio of the multiple image data by using the gradation image and the processing incorporating the highlight clip image into the uppermost level and generating the n-level Laplacian pyramid Y_L_pyramid_final[n]. However, this is an example, and the present invention is not limited to this. Even when only one of them is performed, more dynamic contrast enhancing expression can be made to the highlight portion, while minimizing the influence on the shadow portion in the image-processed image HDR_final.

Figure 12:
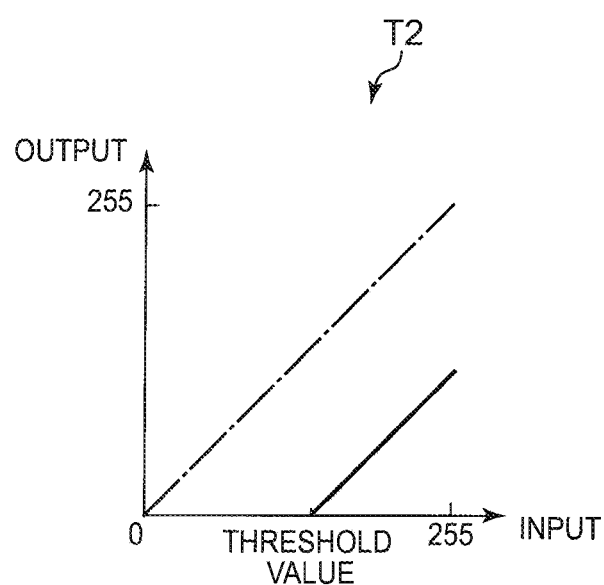
FIG. 12 is a diagram schematically showing a tone conversion table.

Also, in the embodiment 2, the synthesis map may be generated by using the image data after the tone conversion of the luminance component data of the image data as correct exposure, without using the gradation image. That is, by using a tone conversion table T2 shown in FIG. 12, the low to middle luminance area which is equal to or under a predetermined threshold value of the luminance component data of the image data at correct exposure is removed, and tone conversion of reducing the information amount to half is performed for the middle to high luminance area which is larger than the predetermined threshold value. Then, the synthesis map generation unit 2065 performs blending (synthesis in pixel level) of the luminance component data of the image data at correct exposure, the luminance component data smoothed by the E filter unit 2063 and the luminance component data after the tone conversion processing, and generates the synthesis map.

Thereby, the edge of the highlight portion of the synthesis map is aligned, and thus more dynamic contrast enhancement can be performed on a subject which is difficult to separate into dark area and bright area, such as twigs of a tree existing in isolation in a bright sky.

Furthermore, the present invention is not limited to the embodiments 1 and 2, and various types of improvement and changes of design can be made within a scope of the present invention.

For example, in the embodiments 1 and 2, the enhancement level is larger for a smaller difference between the luminance component Y_hdr for each of the pixels of the HDR composite image and the luminance component for each of the pixels of the n-level resized smoothed Gaussian pyramid Y_G_pyramid_lpf_rsz[n]; however, this is an example and the present invention is not limited to this. For example, the enhancement level may be larger for a larger difference. In such case, in the luminance component Y, the detail with larger amplitude is more enhanced, whereas the detail with small amplitude is not enhanced, for example.

Furthermore, the configurations of the image capturing apparatuses 100 and 200 are not limited to those described in the embodiments 1 and 2, which are examples. Images captured by an external image capturing means may be obtained to perform the image enhancement processing, for example.

In addition, in the embodiments 1 and 2, the functions as the first obtaining unit, the first generation unit, the correction unit and the control unit are achieved by, under the control of the central control section 9, driving the image obtaining unit 6b, the first generation unit 6d, the pixel value correction unit 6f and the first data formation control unit 6i, respectively. However, the present invention is not limited to this, and the functions may be achieved by executing a predetermined program and such like by the central control section 9.

That is, a program including a obtaining processing routine, a generation processing routine, a correction processing routine and a control processing routine is stored in a program memory (not shown in the drawings) which stores programs. Then, the obtaining processing routine may make the CPU of the central control section 9 function as a means for obtaining the image data. Also, the generation processing routine may make the CPU of the central control section 9 function as a means for generating multiple levels of pixel values which are respectively smoothed in multiple levels of resolutions by repeatedly performing the smoothing processing and the resolution conversion processing on the pixel value of the obtained image data. The correction processing routine may make the CPU of the central control section 9 function as a means for correcting the pixel values of the image data obtained for each of the levels on the basis of the difference between the pixel value of the obtained image data and the generated pixel value for each of the levels. The control processing routine may make the CPU of the central control section 9 function as a means for controlling to form the data enhancing the pixel value of the obtained image data by utilizing the high frequency component corresponding to the resolution of each of the levels in the image data of each of the levels having the corrected pixel value.

Similarly, the second obtaining unit, the adjustment unit, the separation unit, the second generation unit, the synthesis unit, the image capturing control unit, the pixel addition unit, the third obtaining unit, the information obtaining unit, the information image generation unit and the ratio adjustment unit may also be achieved by executing a predetermined program and the like by the CPU of the central control section 9.

Furthermore, as a computer readable medium storing a program for executing the above processing, in addition to a ROM, a hard disk and such like, a non-volatile memory such as a flash memory and a portable recording medium such as a CD-ROM can be applied. As a medium providing data of program via a predetermined communication line, a carrier wave is also applied.

Though several embodiments of the present invention have been described, the scope of the present invention is not limited to the above-mentioned embodiments, and includes the scope of inventions, which is described in the scope of claims, and the scope equivalent thereof.

The entire disclosure of Japanese Patent Application No. 2012-194901 filed on Sep. 5, 2012 and Japanese Patent Application No. 2012-233429 filed on Oct. 23, 2012 including description, claims, drawings, and abstract are incorporated herein by reference in its entirety.

What is claimed is:

1. An image processing apparatus, comprising:
a first obtaining unit which obtains image data with an expanded dynamic range which is obtained by performing pixel addition on images of nearly the same composition in which luminance is altered in a plurality of luminance levels;
a first generation unit which generates a plurality of levels of pixel values that are respectively smoothed in a plurality of levels of resolutions by repeatedly performing smoothing processing and resolution conversion processing on a pixel value of the image data obtained by the first obtaining unit;
a correction unit which corrects the pixel value of the obtained image data for each of the levels on the basis of a difference between the pixel value of the image data obtained by the first obtaining unit and the pixel value in each of the levels generated by the first generation unit; and
a control unit which controls so as to form image data in which the pixel value of the obtained image data is enhanced by utilizing a high frequency component in each of the levels of the image data having the pixel value corrected by the correction unit, the high frequency component corresponding to each of the levels of the resolutions.

2. The image processing apparatus according to claim 1, further comprising:
a second obtaining unit which obtains an enhancement amount of the pixel value in each of the levels on the basis of the difference between the pixel value of the image data obtained by the first obtaining unit and the pixel value in each of the levels generated by the first generation unit,
wherein the correction unit performs correction so as to enhance the pixel value of the obtained image data for each of the levels with the enhancement amount obtained by the second obtaining unit.

3. The image processing apparatus according to claim 1, further comprising an adjustment unit which adjusts an amount of correction by the correction unit.

4. The image processing apparatus according to claim 1, further comprising an information obtaining unit which obtains information specifying a highlight area of the image data from one of the plurality of levels of the pixel values generated by the first generation unit,
wherein the control unit controls so as to form the image data in which the pixel value of the obtained image data is enhanced, by utilizing, in addition to the high frequency component corresponding to each of the levels of the resolutions, data in which luminance is reduced for an area in the image data having a predetermined level of luminance or more by using the information obtained by the information obtaining unit.

5. The image processing apparatus according to claim 1, wherein the pixel value of the image data includes a luminance value.

6. The image processing apparatus according to claim 5, further comprising:
a separation unit which separates the image data into a luminance component and a chroma component in advance;
a second generation unit which generates chroma image data in which the chroma component separated by the separation unit is enhanced on the basis of an enhancement degree of the luminance value in the image data formed by the control unit; and
a synthesis unit which synthesizes luminance image data formed by the control unit and the chroma image data generated by the second generation unit.

7. The image processing apparatus according to claim 1, further comprising:
an image capturing unit;
an image capturing control unit which controls the image capturing unit so as to capture an image a plurality of times in nearly the same composition while altering an exposure condition, wherein the image data with the expanded dynamic range is generated by performing pixel addition on a plurality of image data obtained by the control of the image capturing control unit.

8. The image processing apparatus according to claim 7, further comprising:
an information image generation unit which generates an information image indicating a broad trend of a luminance component of one of the plurality of image data obtained by the control of the image capturing control unit; and
a ratio adjustment unit which adjusts a ratio of the pixel addition on the plurality of image data by the pixel addition unit by using the information image generated by the information image generation unit.

9. The image processing apparatus according to claim 1, wherein the first generation unit uses a Gaussian pyramid to generate the plurality of levels of the pixel values which are respectively smoothed in the plurality of levels of the resolutions by repeatedly performing the smoothing processing and the resolution conversion processing on the pixel value of the image data obtained by the first obtaining unit.

10. The image processing apparatus according to claim 1, further comprising:
a further obtaining unit which obtains high frequency components in a plurality of levels of resolutions for the pixel value of each of the levels corrected by the correction unit,
wherein the control unit controls so as to specify, among the plurality of levels of the high frequency components obtained by the further obtaining unit, a high frequency component corresponding to the resolution of the pixel value corrected by the correction unit and to form the image data in which the pixel value is enhanced.

11. The image processing apparatus according to claim 10, wherein the further obtaining unit uses a Laplacian pyramid to obtain the high frequency components in the plurality of levels of the resolutions for the pixel value of each of the levels corrected by the correction unit.

12. An image processing method which uses an image processing apparatus, the method comprising:
obtaining image data with an expanded dynamic range which is obtained by performing pixel addition on images of nearly the same composition in which luminance is altered in a plurality of luminance levels;
generating a plurality of levels of pixel values which are respectively smoothed in a plurality of levels of resolutions by repeatedly performing smoothing processing and resolution conversion processing on a pixel value of the obtained image data;
correcting the pixel value of the obtained image data for each of the levels on the basis of a difference between the pixel value of the obtained image data and the generated pixel value of each of the levels; and
controlling so as to form image data in which the pixel value of the obtained image data is enhanced by utilizing a high frequency component in each of the levels of the image data having the corrected pixel value, the high frequency component corresponding to each of the levels of the resolutions.

13. A non-transitory computer readable recording medium which stores a program which is executable by a computer of an image processing apparatus to cause the computer to function as units comprising:
an obtaining unit which obtains image data with an expanded dynamic range which is obtained by performing pixel addition on images of nearly the same composition in which luminance is altered in a plurality of luminance levels;
a generation unit which generates a plurality of levels of pixel values that are respectively smoothed in a plurality of levels of resolutions by repeatedly performing smoothing processing and resolution conversion processing on a pixel value of the image data obtained by the obtaining unit;
a correction unit which corrects the pixel value of the obtained image data for each of the levels on the basis of a difference between the pixel value of the image data obtained by the obtaining unit and the pixel value of each of the levels generated by the generation unit; and
a control unit which performs control so as to form image data in which the pixel value of the obtained image data is enhanced by utilizing a high frequency component in each of the levels of the image data having the pixel value corrected by the correction unit, the high frequency component corresponding to each of the levels of the resolutions.

* * * * *